(12) United States Patent
Akiyama

(10) Patent No.: US 10,466,579 B2
(45) Date of Patent: Nov. 5, 2019

(54) LIGHT SOURCE APPARATUS AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/116,257

(22) Filed: Aug. 29, 2018

(65) Prior Publication Data

US 2019/0064645 A1 Feb. 28, 2019

(30) Foreign Application Priority Data

Aug. 30, 2017 (JP) ................. 2017-165163

(51) Int. Cl.
| | |
|---|---|
| *G03B 21/28* | (2006.01) |
| *G02B 5/30* | (2006.01) |
| *G02B 27/10* | (2006.01) |
| *G02B 5/02* | (2006.01) |
| *G03B 21/20* | (2006.01) |

(Continued)

(52) U.S. Cl.
CPC ......... *G03B 21/28* (2013.01); *G02B 5/0205* (2013.01); *G02B 5/3083* (2013.01); *G02B 27/1006* (2013.01); *G03B 21/204* (2013.01); *G03B 21/2033* (2013.01); *G03B 21/2066* (2013.01); *G03B 21/2073* (2013.01);
(Continued)

(58) Field of Classification Search
CPC .......... G03B 5/30; G03B 21/20; G03B 21/28; G03B 21/2033; G03B 21/204; G03B 21/2066; G03B 21/2073; G02B 5/0205; G02B 5/3083; G02B 27/1006; G02B 27/141; G02B 27/149; G02B 27/283
See application file for complete search history.

(56) References Cited

U.S. PATENT DOCUMENTS

2012/0133903 A1* 5/2012 Tanaka .............. G03B 21/2013
353/31
2015/0301438 A1 10/2015 Akiyama et al.
(Continued)

FOREIGN PATENT DOCUMENTS

JP 2015-203857 A 11/2015
JP 2017-062294 A 3/2017

*Primary Examiner* — Cara E Rakowski
*Assistant Examiner* — Magda Cruz
(74) *Attorney, Agent, or Firm* — Oliff PLC

(57) ABSTRACT

A light source apparatus includes a light source section that outputs first and second light beam fluxes, first and second polarization separation elements, a rotary diffuser plate that diffuses the first light beam flux and the second light beam flux, a first retardation film that converts the incident second light beam flux polarized in a first direction into the second light beam flux polarized in a second direction, and a wavelength conversion element on which the first light beam flux polarized in the first direction and the second light beam flux polarized in the second direction, are incident and which converts the first and second light beam fluxes into a third light beam flux that belongs to a wavelength band different from the wavelength band to which the first and second light beam fluxes belong. The third light beam flux passes through the first and second polarization separation elements.

18 Claims, 5 Drawing Sheets

(51) Int. Cl.
*G02B 27/14* (2006.01)
*G02B 27/28* (2006.01)
(52) U.S. Cl.
CPC .......... *G02B 27/141* (2013.01); *G02B 27/149* (2013.01); *G02B 27/283* (2013.01)

(56) References Cited

U.S. PATENT DOCUMENTS

2017/0329212 A1* 11/2017 Akiyama ............ G03B 21/2066
2018/0252992 A1*  9/2018 Akiyama ............... G03B 21/14
2018/0252993 A1*  9/2018 Akiyama ............. G03B 21/208

* cited by examiner

LIGHT SOURCE APPARATUS AND PROJECTOR

BACKGROUND

1. Technical Field

The present invention relates to a light source apparatus and a projector.

2. Related Art

In recent years, a projector uses a laser light source, which produces high-luminance, high-output light. For example, JP-A-2017-062294 discloses a projector using not only fluorescence produced by incidence of blue laser light on a phosphor layer but diffused blue laser light.

In the invention disclosed in JP-A-2017-062294, light outputted from a first light emitter is divided into two light beam fluxes, which are caused to be incident on a diffuser plate and the phosphor layer, and light outputted from a second light emitter is divided into two light beam fluxes, which are caused to be incident on the diffuser plate and the phosphor layer. The optical density of the light incident on the phosphor layer and the diffuser plate is thus reduced.

The configuration described above reduces the burden on the diffuser plate in terms of the optical density. However, since the light beam flux emitted from the first light emitter and the light beam flux emitted from the second light emitter are incident on the phosphor layer along different optical paths, the size of the entire light source apparatus undesirably increases.

SUMMARY

An advantage of some aspects of the invention is to provide a light source apparatus and a projector capable of reducing the optical density on a rotary diffuser plate and reducing the size of the entire apparatus.

According to a first aspect of the invention, a light source apparatus is provided. The light source apparatus includes a light source section that outputs a first light beam flux and a second light beam flux, a first polarization separation element that reflects the first light beam flux polarized in a first direction and transmits the first light beam flux polarized in a second direction perpendicular to the first direction, a second polarization separation element that reflects the second light beam flux polarized in the first direction and transmits the second light beam flux polarized in the second direction, a rotary diffuser plate which rotates around a center axis of rotation, on which the first light beam flux having passed through the first polarization separation element is incident in a first position separate from the center axis of rotation by a first length, on which the second light beam flux having passed through the second polarization separation element is incident in a second position separate from the center axis of rotation by a second length different from the first length, and which diffuses the incident first light beam flux and second light beam flux, a first retardation film on which the second light beam flux polarized in the first direction and reflected off the second polarization separation element is incident and which converts the second light beam flux polarized in the first direction into the second light beam flux polarized in the second direction, and a wavelength conversion element on which the first light beam flux polarized in the first direction and reflected off the first polarization separation element and the second light beam flux polarized in the second direction, having exited out of the first retardation film, and having passed through the first polarization separation element are incident and which converts the first light beam flux polarized in the first direction and the second light beam flux polarized in the second direction into a third light beam flux that belongs to a wavelength band different from a wavelength band to which the first light beam flux polarized in the first direction and the second light beam flux polarized in the second direction belong, and the first polarization separation element and the second polarization separation element transmit the third light beam flux.

In the light source apparatus according to the first aspect, since the first light beam flux having passed through the first polarization separation element and the second light beam flux having passed through the second polarization separation element are incident on the first and second positions on the rotary diffuser plate, respectively, the optical density on the rotary diffuser plate can be reduced, and an increase in the temperature of the rotary diffuser plate can therefore be reduced. Damage of the rotary diffuser plate can therefore be avoided.

Since the first retardation film is provided, the second light beam flux polarized in the first direction and reflected off the second polarization separation element can be converted into light polarized in the second direction, which can therefore pass through the first polarization separation element. The optical paths of the first light beam flux and the second light beam flux incident on the wavelength conversion element can therefore be superimposed on each other, whereby the size of the light source apparatus can be reduced.

Further, since the first polarization separation element and the second polarization separation element can transmit the third light beam flux, the optical path of the third light beam flux can be superimposed on the optical paths of the first light beam flux and the second light beam flux, whereby the size of the light source apparatus can be reduced.

A compact light source apparatus in which the burden on the rotary diffuser plate in terms of optical density is reduced is therefore provided.

In the first aspect described above, the light source apparatus may further include a second retardation film on which the first light beam flux outputted from the light source section is incident, which polarizes the first light beam flux in the first direction and outputs the first light beam flux polarized in the first direction, and which polarizes the first light beam flux in the second direction and outputs the first light beam flux polarized in the second direction and a third retardation film on which the second light beam flux outputted from the light source section is incident, which polarizes the second light beam flux in the first direction and outputs the second light beam flux polarized in the first direction, and which polarizes the second light beam flux in the second direction and outputs the second light beam flux polarized in the second direction.

According to the configuration described above, changing the ratio among the first light beam flux passing through the first polarization separation element and incident on the rotary diffuser plate, the second light beam flux passing through the second polarization separation element and incident on the rotary diffuser plate, and the third light beam flux produced by the wavelength conversion element allows the color tone of illumination light to be changed.

In the first aspect described above, the second retardation film and the third retardation film may each be configured to be rotatable, the second retardation film and the third retardation film may rotate in a same direction, and the second retardation film and the third retardation film may rotate by a same angle.

According to the configuration described above, adjusting the angles of rotation of the second retardation film and the third retardation film allows adjustment of the color balance of the illumination light. Further, since the second retardation film and the third retardation film rotate in the same direction, and the second retardation film and the third retardation film rotate by the same angle, the difference in optical density between the first and second positions on the rotary diffuser plate can be reduced. The color balance of the illumination light can therefore be adjusted with the burden on the rotary diffuser plate in terms of optical density reduced.

The angles of rotation of the second retardation film and the third retardation film may not be completely equal to each other and only need to be roughly equal to each other as long as the burden on the rotary diffuser plate in terms of optical density can be reduced.

In the first aspect described above, the light source apparatus may further include a fourth retardation film on which the first light beam flux polarized in the second direction and passing through the first polarization separation element is incident and which converts the first light beam flux polarized in the second direction into the first light beam flux formed of circularly polarized light and a fifth retardation film on which the second light beam flux polarized in the second direction and passing through the second polarization separation element is incident and which converts the second light beam flux polarized in the second direction into the second light beam flux formed of circularly polarized light. The first light beam flux formed of circularly polarized light and outputted from the fourth retardation film is circularly polarized light rotating in a first rotational direction and is converted into the first light beam flux formed of circularly polarized light rotating in a second rotational direction different from the first rotational direction when incident on the rotary diffuser plate and diffused by and reflected off the rotary diffuser plate, and the second light beam flux formed of circularly polarized light and outputted from the fifth retardation film is circularly polarized light rotating in the second rotational direction and is converted into the second light beam flux formed of circularly polarized light rotating in the first rotational direction when incident on the rotary diffuser plate and diffused by and reflected off the rotary diffuser plate.

According to the configuration described above, a light source apparatus in which the burden on the rotary diffuser plate in terms of optical density is reduced is provided.

In the first aspect described above, the fourth retardation film may receive as an input the first light beam flux formed of circularly polarized light rotating in the second rotational direction and convert the first light beam flux formed of circularly polarized light rotating in the second rotational direction into the first light beam flux diffused and polarized in the first direction, and the fifth retardation film may receive as an input the second light beam flux formed of circularly polarized light rotating in the first rotational direction and convert the second light beam flux formed of circularly polarized light rotating in the first rotational direction into the second light beam flux diffused and polarized in the first direction. The diffused first light beam flux polarized in the first direction may be reflected off the first polarization separation element, and the diffused first light beam flux polarized in the first direction and reflected off the first polarization separation element may be incident on the first retardation film and converted by the first retardation film into the first light beam flux diffused and polarized in the second direction. The diffused first light beam flux polarized in the second direction may pass through the second polarization separation element, and the diffused second light beam flux polarized in the first direction may be reflected off the second polarization separation element.

Since the diffused first light beam flux polarized in the first direction and reflected off the first polarization separation element is incident on the first retardation film and converted by the first retardation film into the diffused first light beam flux polarized in the second direction, the diffused first light beam flux polarized in the second direction can pass through the second polarization separation element, the optical paths of the diffused first light beam flux and the diffused second light beam flux can be superimposed on each other, whereby the size of the light source apparatus can be reduced.

According to a second aspect of the invention, a projector is provided. The projector includes the light source apparatus according to the first aspect, a light modulator that modulates light outputted from the light source apparatus in accordance with image information to form image light, and a projection optical apparatus that projects the image light.

The projector according to the aspect described above, which includes the light source apparatus including the rotary diffuser plate having improved reliability, can be improved in reliability and reduced in size.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
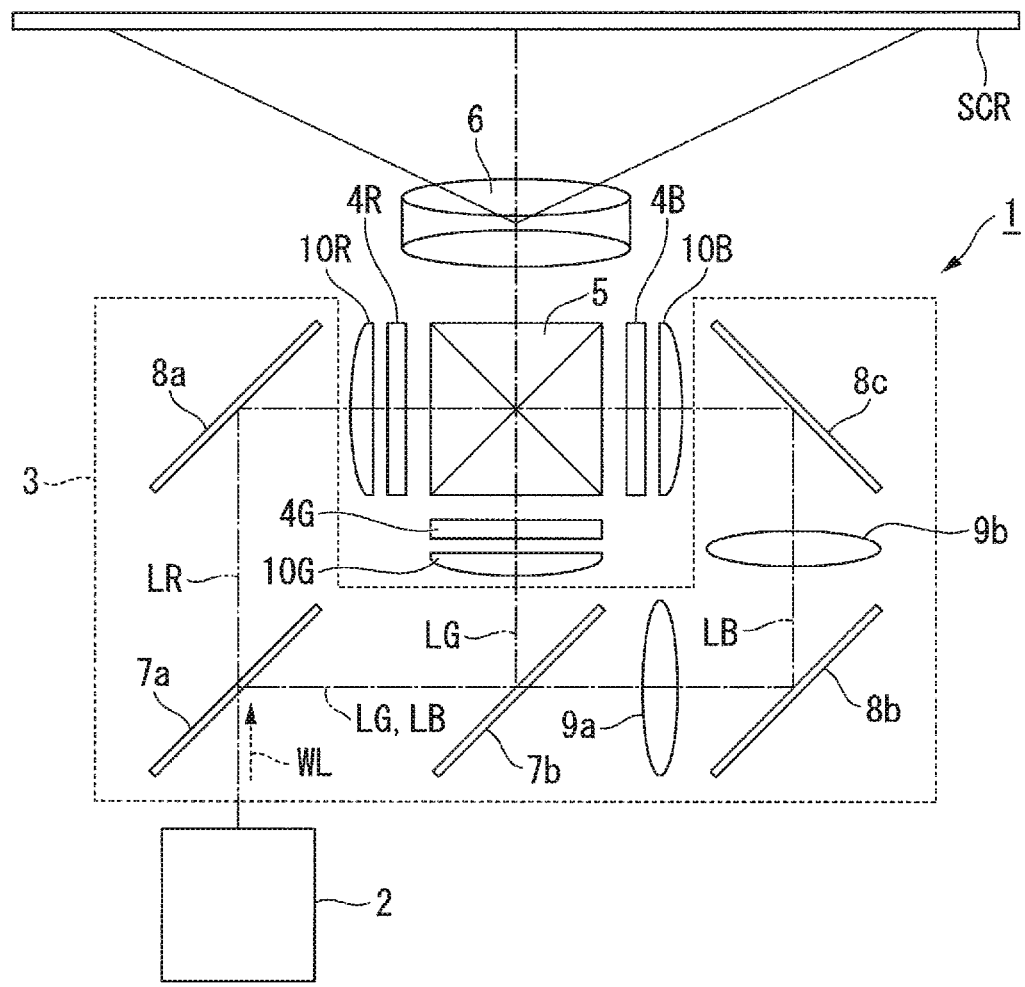
FIG. 1 shows a schematic configuration of a projector.

An embodiment of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

An example of a projector according to the present embodiment will be described.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes a light source apparatus 2, a color separation system 3, a light modulator 4R, a light modulator 4G, a light modulator 4B, a light combining system 5, and a projection optical apparatus 6.

The color separation system 3 separates white illumination light WL from the light source apparatus 2 into red light LR, green light LG, and blue light LB. The color separation system 3 includes a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the illumination light WL from the light source apparatus 2 into the red light LR and the other light (green light LG and blue light LB). The first dichroic mirror 7a transmits the separated red light LR and reflects the other light. The second dichroic mirror 7b reflects the green light LG and transmits the blue light LB.

The first total reflection mirror 8a reflects the red light LR toward the light modulator 4R. The second total reflection mirror 8b and the third total reflection mirror 8c guide the blue light LB to the light modulator 4B. The green light LG is reflected off the second dichroic mirror 7b toward the light modulator 4G.

The first relay lens 9a and the second relay lens 9b are disposed in the optical path of the blue light LB and on the downstream side of the second dichroic mirror 7b.

The light modulator 4R modulates the red light LR in accordance with image information to form red image light. The light modulator 4G modulates the green light LG in accordance with image information to form green image light. The light modulator 4B modulates the blue light LB in accordance with image information to form blue image light.

The light modulators 4R, 4G, and 4B are each, for example, a transmissive liquid crystal panel. Polarizers (not shown) are disposed on the light incident side and the light exiting side of each of the liquid crystal panels.

Field lenses 10R, 10G, and 10B are disposed on the light incident side of the light modulators 4R, 4G, and 4B, respectively.

The image light fluxes from the light modulators 4R, 4G, and 4B enter the light combining system 5. The light combining system 5 combines the image light fluxes with one another and causes the combined image light to exit toward the projection optical apparatus 6. The light combining system 5 is, for example, a cross dichroic prism.

The projection optical apparatus 6 is formed of a projection lens group, enlarges the combined image light from the light combining system 5, and projects the enlarged image light toward the screen SCR. Enlarged color video images are thus displayed on the screen SCR.

Light Source Apparatus

The configuration of the light source apparatus 2 will next be described. Each component of the light source apparatus will be described below by using an XYZ coordinate system as required.

Figure 2:
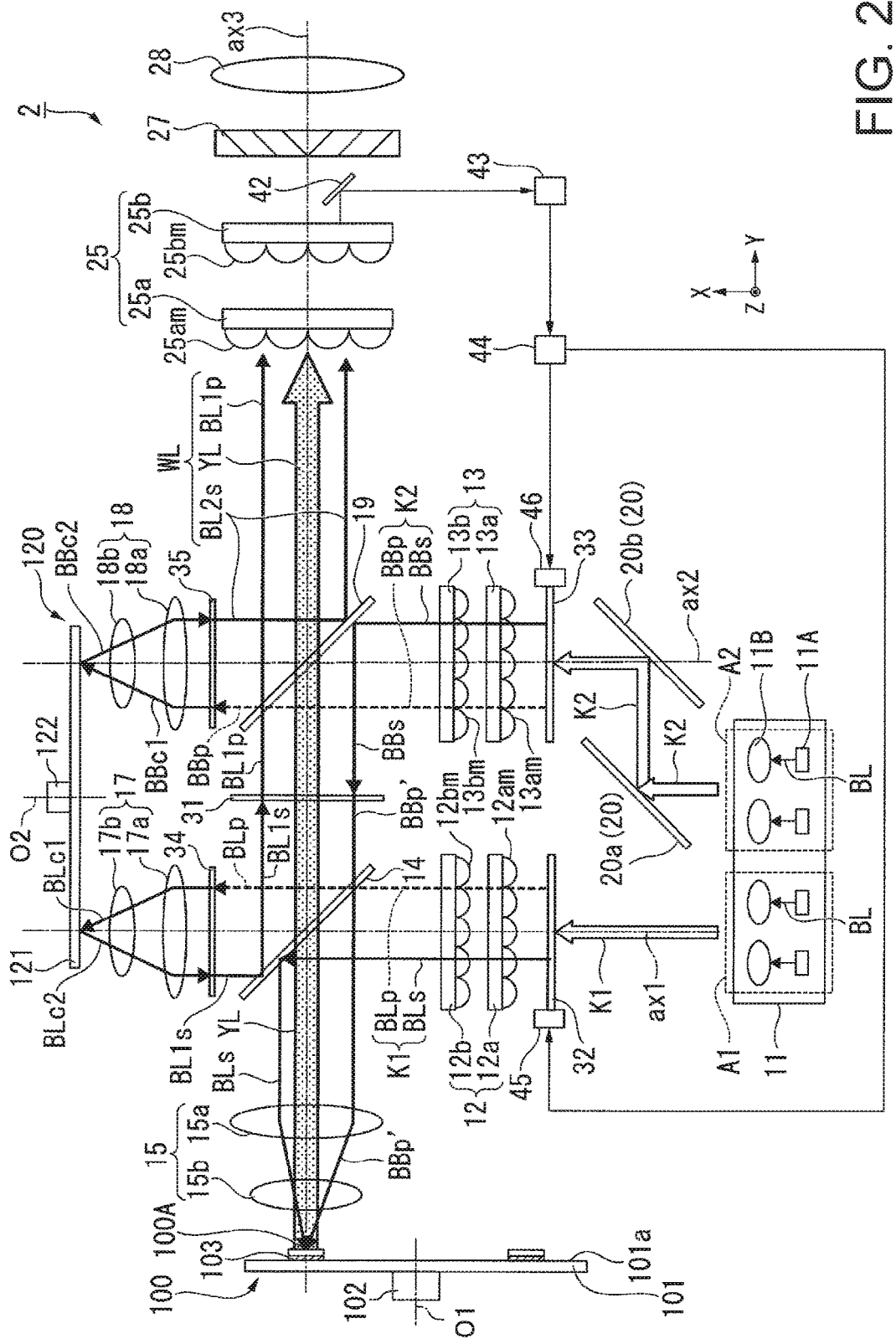
FIG. 2 shows a schematic configuration of a light source apparatus.

FIG. 2 shows a schematic configuration of the light source apparatus 2. In FIG. 2, the X direction is the direction parallel to optical axes ax1 and ax2, the Y direction is the direction parallel an illumination optical axis ax3, which is perpendicular to the optical axes ax1 and ax2, and the Z direction is the direction perpendicular to the X and Y directions.

The light source apparatus 2 includes a light source section 11, a first homogenizer optical system 12, a second homogenizer optical system 13, a first polarization separation element 14, a first pickup optical system 15, a rotary fluorescing plate 100, a rotary diffuser plate 120, a second pickup optical system 17, a third pickup optical system 18, a second polarization separation element 19, an optical path changer 20, a first retardation film 31, a second retardation film 32, a third retardation film 33, a fourth retardation film 34, a fifth retardation film 35, an optical integration system 25, a polarization conversion element 27, and a superimposing lens 28.

The light source section 11 will be described.

The light source section 11 includes a plurality of light emitting sections 11A and a plurality of collimation lenses 11B.

The plurality of light emitting sections 11A are each formed of a semiconductor laser. The plurality of light emitting sections 11A are arranged in an array in the same plane perpendicular to the optical axis ax1. The light emitting sections 11A each emit a light beam BL formed of a blue light beam (intensity of emitted light peaks at about 445 nm).

The light emitting sections 11A can instead each be a semiconductor laser that emits a light beam BL having a wavelength other than 445 nm (460 nm, for example).

The plurality of collimation lenses 11B are arranged, for example, in an array. The plurality of collimation lenses 11B are disposed in correspondence with the plurality of light emitting sections 11A. The collimation lenses 11B each convert the light beam BL emitted from the corresponding light emitting section 11A into parallelized light.

The light source section 11 outputs a first light beam flux K1 and a second light beam flux K2.

The light source section 11 includes a first region A1, which outputs the first light beam flux K1, and a second region A2, which outputs the second light beam flux K2.

The first light beam flux K1 is formed of a plurality of light beams BL emitted from a plurality of light emitting sections 11A arranged in the first region A1. The second light beam flux K2 is formed of a plurality of light beams BL emitted from a plurality of light emitting sections 11A arranged in the second region A2. The first light beam flux K1 and the second light beam flux K2 are formed of light beams that belong to the same wavelength band.

The first light beam flux K1 and the second light beam flux K2 have the same light flux width.

Further, the amount of the first light beam flux K1 and the amount of the second light beam flux K2 each correspond to 50% of the total amount of the light outputted from the light source section 11.

In FIG. 2, reference character ax1 denotes the optical axis in the first region A1. The optical axis ax1 coincides with the principal ray of the first light beam flux K1.

The second retardation film 32, the first homogenizer system 12, the first polarization separation element 14, the fourth retardation film 34, the second pickup system 17, and the rotary diffuser plate 120 are provided along the optical path of the principal ray of the first light beam flux K1 (along optical axis ax1) in the present order counted from the first region A1 of the light source section 11.

The second light beam flux K2 outputted from the second region A2 of the light source section 11 enters the optical path changer 20. The optical path changer 20 is formed of a pair of mirrors 20a and 20b. The mirror 20a reflects the second light beam flux K2 toward the mirror 20b. The mirror 20b reflects the second light beam flux K2 from the mirror 20a in such a way that the reflected second light beam flux K2 travels along the optical axis ax2. As described above, the second light beam flux K2 travels through the optical path changer 20, which shifts the optical path of the second light beam flux K2 in the +Y direction from the optical path before the second light beam flux K2 travels through the optical path changer 20, and the principal ray of the second light beam flux K2 having traveled through the optical path changer 20 coincides with the optical axis ax2.

The third retardation film 33, the second homogenizer system 13, the second polarization separation element 19, the fifth retardation film 35, the third pickup system 18, and the rotary diffuser plate 120 are provided along the optical path of the principal ray of the second light beam flux K2 (along optical axis ax2) in the present order counted from the mirror 20b of the optical path changer 20.

The rotary fluorescing plate 100, the first pickup system 15, the first polarization separation element 14, the first retardation film 31, the second polarization separation element 19, the optical integration system 25, the polarization conversion element 27, and the superimposing lens 28 are sequentially arranged along the illumination optical axis ax3.

The optical axes ax1 and ax2 and the illumination optical axis ax3 are present in the same plane. The optical axes ax1 and ax2 are perpendicular to the illumination optical axis ax3.

The first light beam flux K1 outputted from the light source section 11 will first be described.

The first light beam flux K1 outputted from the light source section 11 is incident on the second retardation film 32. The second retardation film 32 is, for example, a half wave plate configured to be rotatable. The first light beam flux k1 is linearly polarized light. The light having passed through the second retardation film 32 contains an S-polarized component and a P-polarized component mixed with each other at a predetermined ratio. That is, appropriately setting the angle of rotation of the second retardation film 32 allows the ratio between the S-polarized component and the P-polarized component to be set at a predetermined value.

The first light beam flux K1 having passed through the second retardation film 32 includes a first light beam flux K1 formed of the S-polarized component (light beam flux BLs) and a first light beam flux K1 formed of the P-polarized component (light beam flux BLp).

In the present embodiment, the first light beam flux K1 formed of the S-polarized component (light beam flux BLs) corresponds to "the first light beam flux polarized in a first direction" in the appended claims, and the first light beam flux K1 formed of the P-polarized component (light beam flux BLp) corresponds to "the first light beam flux polarized in a second direction" in the appended claims.

In the present embodiment, the angle of rotation of the second retardation film 32 is so set that the amount of the first light beam flux K1 formed of the P-polarized component (light beam flux BLp) is about 10% of the amount of light from the first region A1 of the light source section 11 (amount of first light beam flux K1). The amount of light incident on the rotary diffuser plate 120 can thus be suppressed.

The first light beam flux K1 having passed through the second retardation film 32 is incident on the first homogenizer system 12. The first homogenizer system 12 is formed, for example, of a lens array 12a and a lens array 12b. The lens array 12a includes a plurality of lenslets 12am, and the lens array 12b includes a plurality of lenslets 12bm.

The first polarization separation element 14 has a color separation function of transmitting fluorescence YL, which will be described later and differs from the first light beam flux K1 in terms of light emission intensity peak (wavelength band), irrespective of the polarization state of the fluorescence YL. The first polarization separation element 14 may therefore be formed, for example, of a dichroic mirror having wavelength selectivity. The first polarization separation element 14 is so disposed as to incline by 45° with respect to the optical axis ax1 and the illumination optical axis ax3.

The first polarization separation element 14 reflects the S-polarized component of the first light beam flux K1 (light beam flux BLs) and transmits the P-polarized component of the first light beam flux K1 (light beam flux BLp). That is, the first polarization separation element 14 has a polarization separation function of separating the first light beam flux K1 into the first light beam flux K1 formed of the S-polarized light component (light beam flux BLs) and the first light beam flux K1 formed of the P-polarized light component (light beam flux BLp).

The first polarization separation element 14 reflects the S-polarized component of the light incident thereon and transmits the P-polarized component thereof.

The first light beam flux K1 formed of the P-polarized component (light beam flux BLp) having passed the first polarization separation element 14 is incident on the fourth retardation film 34. The fourth retardation film 34 is formed of a quarter wave plate (λ/4 plate). The first light beam flux K1 formed of the P-polarized component (light beam flux BLp) passes through the fourth retardation film 34, which converts the first light beam flux K1 into a first light beam flux K1 formed, for example, of right-handed circularly polarized light (light beam flux BLc1). The circularly polarized first light beam flux K1 having exited out of the fourth retardation film 34 (light beam flux BLc1) enters the second pickup system 17.

The first light beam flux K1 formed of the S-polarized component and reflected off the first polarization separation element 14 (light beam flux BLs) will be described later.

The second pickup system 17 has the function of collecting the circularly polarized first light beam flux K1 (light beam flux BLc1) and directing the collected first light beam flux K1 toward the rotary diffuser plate 120 and the function of picking up and parallelizing diffused reflected light outputted from the rotary diffuser plate 120. The second pickup system 17 is formed, for example, of pickup lenses 17a and 17b.

The temperature of the second pickup system 17 is likely to increase. A photoelastic effect (birefringence) is therefore likely to occur. When birefringence occurs, the polarization state of the light passing through the second pickup system 17 is disturbed, and it is therefore difficult to efficiently extract the diffused light produced by the rotary diffuser plate 120 as illumination light.

In the present embodiment, at least one of the pickup lenses 17a and 17b, which form the second pickup system 17, specifically, the pickup lens 17b is formed of a quartz lens. A quartz lens internally absorbs a small amount of light and has a small coefficient of thermal expansion as compared with those of a lens made of a typical glass material.

In the present embodiment, the material of the quartz lens is, for example, synthetic quartz. The internal absorptance of synthetic quartz at the wavelengths of blue light is, for example, 0.1% or lower, which is about 1/50 the internal absorptance of a typical optical glass material. The quartz lens, even when intense light is incident thereon, is therefore unlikely to generate heat. Further, the coefficient of thermal expansion of synthetic quartz is about 1/10 of the coefficient of thermal expansion of a typical optical glass material. Synthetic quartz is therefore unlikely to be distorted even if the temperature thereof increases. That is, a change in the polarization state due to the photoelastic effect is unlikely to occur.

As described above, according to the second pickup system 17 including a quartz lens, thermal distortion resulting from the incidence of the circularly polarized first light beam flux K1 (light beam flux BLc1) is unlikely to occur, and the occurrence of birefringence therefore decreases, whereby the amount of disturbance of the polarization state of the circularly polarized first light beam flux K1 (light beam flux BLc1) passing through the second pickup system 17 or a light beam flux BLc2, which will be described later, can be reduced. A first light beam flux K1 produced by the rotary diffuser plate 120 (light beam flux BL1s and light beam flux BL1p) can therefore be efficiently extracted as illumination light.

The second pickup system 17 cooperates with the first homogenizer system 12 to homogenize the illuminance distribution of the circularly polarized first light beam flux K1 (light beam flux BLc1) on the rotary diffuser plate 120, which will be described later. In the present embodiment, the rotary diffuser plate 120 is disposed in the position of the focal point of the second pickup system 17.

The rotary diffuser plate 120 diffusively reflects the circularly polarized first light beam flux K1 (light beam flux BLc1) having exited out of the second pickup system 17 toward the first polarization separation element 14.

For example, the right-handed circularly polarized first light beam flux K1 (light beam flux BLc1), when diffused by and reflected off a diffusive reflector 121, is converted into a first light beam flux K1 formed of left-handed circularly polarized light (light beam flux BLc2). The circularly polarized first light beam flux K1 (light beam flux BLc2) is parallelized by the second pickup system 17 and passes through the fourth retardation film 34, which converts the first light beam flux K1 into a diffused first light beam flux K1 formed of the S-polarized component (light beam flux BL1s). The light beam flux BL1s is diffused blue light containing the S-polarized component. Since the first polarization separation element 14 is configured to reflect the S-polarized component of the first light beam flux K1, the diffused first light beam flux K1 formed of the S-polarized component (light beam flux BL1s) is reflected off the first polarization separation element 14 toward the first retardation film 31.

The first retardation film 31 is a half wave plate. The first retardation film 31 converts the diffused first light beam flux K1 formed of the S-polarized component (light beam flux BL1s) into a diffused first light beam flux K1 formed of the P-polarized component (light beam flux BL1p). The diffused first light beam flux K1 formed of the P-polarized component (light beam flux BL1p) is incident on the second polarization separation element 19, which will be described later. The second polarization separation element 19 transmits the diffused first light beam flux K1 formed of the P-polarized component (light beam flux BL1p).

The second light beam flux K2 having traveled through the optical path changer 20 will subsequently be described.

The second light beam flux K2 having traveled through the optical path changer 20 is incident on the third retardation film 33. The third retardation film 33 is, for example, a half wave plate configured to be rotatable. The second light beam flux k2 is linearly polarized light. The light having passed through the third retardation film 33 contains the S-polarized component and the P-polarized component mixed with each other at a predetermined ratio. That is, appropriately setting the angle of rotation of the third retardation film 33 allows the ratio between the S-polarized component and the P-polarized component to be set at a predetermined value.

The second light beam flux K2 having passed through the third retardation film 33 includes a second light beam flux K2 formed of the S-polarized component (light beam flux BBs) and a second light beam flux K2 formed of the P-polarized component (light beam flux BBp).

In the present embodiment, the second light beam flux K2 formed of the S-polarized component (light beam flux BBs) corresponds to "the second light beam flux polarized in the first direction" in the appended claims, and the second light beam flux K2 formed of the P-polarized component (light beam flux BBp) corresponds to "the second light beam flux polarized in the second direction" in the appended claims.

In the present embodiment, the angle of rotation of the third retardation film 33 is so set that the amount of the second light beam flux K2 formed of the P-polarized component (light beam flux BBp) is about 10% of the amount of light from the second region A2 of the light source section 11 (amount of second light beam flux K2). The amount of light incident on the rotary diffuser plate 120 can thus be suppressed.

The second light beam flux K2 having passed through the third retardation film 33 is incident on the second homogenizer system 13. The second homogenizer system 13 is formed, for example, of a lens array 13a and a lens array 13b. The lens array 13a includes a plurality of lenslets 13am, and the lens array 13b includes a plurality of lenslets 13bm.

The second polarization separation element 19 has a color separation function of transmitting the fluorescence YL, which will be described later and differs from the second light beam flux K2 in terms of light emission intensity peak (wavelength band), irrespective of the polarization state of the fluorescence YL. The second polarization separation element 19 may therefore be formed, for example, of a dichroic mirror having wavelength selectivity. The second polarization separation element 19 is so disposed as to incline by 45° with respect to the optical axis ax2.

The second polarization separation element 19 reflects the S-polarized component of the second light beam flux K2 and transmits the P-polarized component of the second light beam flux K2.

That is, the second polarization separation element 19 has a polarization separation function of separating the second light beam flux K2 into the second light beam flux K2 formed of the S-polarized light component (light beam flux BBs) and the second light beam flux K2 formed of the P-polarized light component (light beam flux BBp).

The second polarization separation element 19 reflects the S-polarized component of the light incident thereon (light beam flux BBs) and transmits the P-polarized component thereof (light beam flux BBp).

The second light beam flux K2 formed of the P-polarized component (light beam flux BBp) having passed the second polarization separation element 19 is incident on the fifth retardation film 35. The fifth retardation film 35 is formed of a quarter wave plate (λ/4 plate). The second light beam flux K2 formed of the P-polarized component (light beam flux BBp) passes through the fifth retardation film 35, which converts the second light beam flux K2 into a second light beam flux K2 formed, for example, of left-handed circularly polarized light (light beam flux BBc1). The circularly polarized second light beam flux K2 having exited out of the fifth retardation film 35 (light beam flux BBc1) enters the third pickup system 18.

The second light beam flux K2 formed of the S-polarized component and reflected off the second polarization separation element 19 (light beam flux BBs) will be described later.

The third pickup system 18 has the function of collecting the circularly polarized second light beam flux K2 (light beam flux BBc1) and directing the collected second light beam flux K2 toward the rotary diffuser plate 120 and the function of picking up and parallelizing diffused reflected light outputted from the rotary diffuser plate 120. The third pickup system 18 is formed, for example, of pickup lenses 18*a* and 18*b*.

In the present embodiment, at least one of the pickup lenses 18*a* and 18*b*, which form the third pickup system 18, specifically, the pickup lens 18*b* is formed of a quartz lens, as is the second pickup system 17. The pickup lenses 18*a* and 18*b* may instead each be formed of a quartz lens.

Therefore, according to the third pickup system 18 including a quartz lens, thermal distortion resulting from the incidence of the circularly polarized second light beam flux K2 (light beam flux BBc1) is unlikely to occur, and the occurrence of birefringence therefore decreases, whereby the amount of disturbance of the polarization state of the circularly polarized second light beam flux K2 (light beam flux BBc1) passing through the third pickup system 18 or a light beam flux BBc2, which will be described later, can be reduced. A second light beam flux K2 produced by the rotary diffuser plate 120 (light beam flux BL2*s*) can therefore be efficiently extracted as illumination light.

The third pickup system 18 cooperates with the second homogenizer system 13 to homogenize the illuminance distribution of the circularly polarized second light beam flux K2 (light beam flux BBc1) on the rotary diffuser plate 120. In the present embodiment, the rotary diffuser plate 120 is disposed in the position of the focal point of the third pickup system 18.

The rotary diffuser plate 120 diffusively reflects the circularly polarized second light beam flux K2 (light beam flux BBc1) having exited out of the third pickup system 18 toward the second polarization separation element 19.

For example, the left-handed circularly polarized second light beam flux K2 (light beam flux BBc1), when diffused by and reflected off the diffusive reflector 121, is converted into a second light beam flux K2 formed of right-handed circularly polarized light (light beam flux BBc2). The circularly polarized second light beam flux K2 (light beam flux BBc2) is parallelized by the third pickup system 18 and passes through the fifth retardation film 35, which converts the second light beam flux K2 into a diffused second light beam flux K2 formed of the S-polarized component (light beam flux BL2*s*). The light beam flux BL2*s* is diffused blue light containing the S-polarized component. Since the second polarization separation element 19 is configured to reflect the S-polarized component of the second light beam flux K2, the diffused second light beam flux K2 formed of the S-polarized component (light beam flux BL2*s*) is reflected off the second polarization separation element 19 toward the optical integration system 25.

Figure 3:
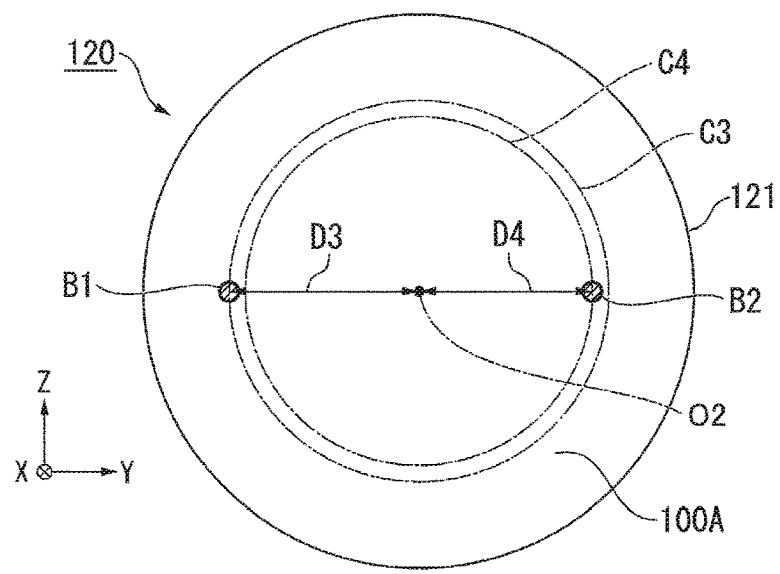
FIG. 3 is a plan view of a rotary diffuser plate viewed in the direction parallel to an optical axis.

The rotary diffuser plate 120 will be described in more detail. FIG. 3 is a plan view of the rotary diffuser plate 120 viewed in the direction parallel to the optical axes ax1 and ax2.

The rotary diffuser plate 120 includes the diffusive reflector 121 and a driver 122, which drives and rotates the diffusive reflector 121. The rotary diffuser plate 120 outputs diffused light toward the light incident side thereof.

The diffusive reflector 121 is formed, for example, of a light reflective member and has irregularities on the surface thereof. The diffusive reflector 121 is formed, for example, by deposition of an Ag film on a surface of a base having irregularities formed in a blasting process. The diffusive reflector 121 is rotatable around a predetermined center axis of rotation O2. The driver 122 is formed, for example, of a motor and rotates the diffusive reflector 121 around the center axis of rotation O2.

The diffusive reflector 121 is so disposes as to face the second pickup system 17 and the third pickup system 18, as shown in FIG. 2. The diffusive reflector 121 is formed, for example, in a circular shape when viewed along the center axis of rotation O2, as shown in FIG. 3.

In FIG. 3, reference character B1 denotes the position where the circularly polarized first light beam flux K1 (light beam flux BLc1) is incident on the rotary diffuser plate 120 (diffusive reflector 121) via the second pickup system 17, and reference character B2 denotes the position where the circularly polarized second light beam flux K2 (light beam flux BBc1) is incident on the rotary diffuser plate 120 (diffusive reflector 121) via the third pickup system 18.

As shown in FIG. 3, the distance D3 between the position B1 where the circularly polarized first light beam flux K1 (light beam flux BLc1) is incident and the center axis of rotation O2 differs from the distance D4 between the position B2 where the circularly polarized second light beam flux K2 (light beam flux BBc1) is incident and the center axis of rotation O2. Specifically, the distance D3 is greater than the distance D4. In the present embodiment, the distance D3 corresponds to the "first length" described in the appended claims, and the distance D4 corresponds to the "second length" described in the appended claims.

The configuration described above causes the circularly polarized first light beam flux K1 (light beam flux BLc1) to be incident on a first position on the diffusive reflector 121 (circumferential region labeled with reference character C3 and separate from center axis of rotation O2 by distance D3) and the circularly polarized second light beam flux K2 (light beam flux BBc1) to be incident on a second position on the diffusive reflector 121 (circumferential region labeled with reference character C4 and separate from center axis of rotation O2 by distance D4).

Therefore, during one turn of the diffusive reflector 121, the region where the circularly polarized first light beam flux K1 (light beam flux BLc1) is incident on the diffusive reflector 121 is not the same as the region where the circularly polarized second light beam flux K2 (light beam flux BBc1) is incident on the diffusive reflector 121.

As a reflection film that satisfies the polarization preservation factor and other conditions, the diffusive reflector 121 of the rotary diffuser plate 120 is a metal film, such as a silver film. The metal film, such as a silver film, has high reflectance but is likely to be damaged by heat and light, as compared with a dielectric film.

In the present embodiment, however, since the circularly polarized first light beam flux K1 (light beam flux BLc1), which is part of the first light beam flux K1, and the circularly polarized second light beam flux K2 (light beam flux BBc1), which is part of the second light beam flux K2, are incident on different locations on the diffusive reflector 121, an increase in temperature of the diffusive reflector 121 can be reduced, whereby damage of the diffusive reflector 121 can be avoided. Examples of the damage of the diffusive reflector 121 may include degradation of the reflection film (such as Ag film), which is formed on the surface of the diffusive reflector 121, in a chemical reaction induced by heat and light.

In the present invention, the amount of the first light beam flux K1 and the amount of the second light beam flux K2 are each 50% of the total amount of the light outputted from the light source section 11. The angle of rotation of the second retardation film 32 is so set that the amount of the first light beam flux K1 formed of the P-polarized component (light beam flux BLp) is about 10% the amount of the light from the first region A1 of the light source section 11 (amount of first light beam flux K1). Further, the angle of rotation of the third retardation film 33 is so set that the amount of the second light beam flux K2 formed of the P-polarized component (light beam flux BBp) is about 10% the amount of the light from the second region A2 of the light source section 11 (amount of second light beam flux K2).

As a result, the optical density of the circularly polarized first light beam flux K1 (light beam flux BLc1) incident on the first position B1 can be equal to the optical density of the circularly polarized second light beam flux K2 (light beam flux BBc1) incident on the second position B2. Therefore, since the optical density in either the incidence position B1 or B2 on the diffusive reflector 121 is not higher than the other, damage of the diffusive reflector 121 can be avoided with the optical density on the diffusive reflector 121 reduced.

Therefore, according to the rotary diffuser plate 120 in the present embodiment, the reliability of the diffusive reflector 121 increases, whereby the reliability of the light source apparatus 2 can be improved.

The optical path of the light that produces the fluorescence YL in the rotary fluorescing plate 100 will subsequently be described.

The first light beam flux K1 formed of the S-polarized component (light beam flux BLs) is reflected off the first polarization separation element 14 and directed toward the rotary fluorescing plate 100, as shown in FIG. 2. The first light beam flux K1 formed of the S-polarized component (light beam flux BLs) and reflected off the first polarization separation element 14 enters the first pickup system 15.

Similarly, the second light beam flux K2 formed of the S-polarized component (light beam flux BBs) is reflected off the second polarization separation element 19 and directed toward the rotary fluorescing plate 100. The second light beam flux K2 formed of the S-polarized component (light beam flux BBs) and reflected off the second polarization separation element 19 passes through the first retardation film 31, which converts the second light beam flux K2 into a second light beam flux K2 formed of the P-polarized component (light beam flux BBp'). The second light beam flux K2 formed of the P-polarized component (light beam flux BBp') passes through the first polarization separation element 14 and enters the first pickup system 15.

The first pickup system 15 has the function of collecting the light beam flux BLs and directing the collected light beam flux BLs toward a phosphor layer 100A of the rotary fluorescing plate 100 and the function of picking up and parallelizing the fluorescence YL emitted from the phosphor layer 100A. The first pickup system 15 is formed, for example, of pickup lenses 15a and 15b.

The first pickup system 15 cooperates with the first homogenizer system 12 to homogenize the illuminance distribution of the first light beam flux K1 formed of the S-polarized component (light beam flux BLs) on the phosphor layer 100A.

Similarly, the first pickup system 15 cooperates with the second homogenizer system 13 to homogenize the illuminance distribution of the second light beam flux K2 formed of the P-polarized component (light beam flux BBp') on the phosphor layer 100A.

The rotary fluorescing plate 100 includes a rotary substrate 101, a driver 102, which drives and rotates the rotary substrate 101, and the phosphor layer 100A provided on the rotary substrate 101. The rotary fluorescing plate 100 outputs the fluorescence YL toward the light incident side thereof.

The rotary substrate 101 is formed of a disc made of a metal that excels in heat dissipation, such as aluminum and copper, and is rotatable around a predetermined center axis of rotation O1. The driver 102 is formed, for example, of a motor and rotates the rotary substrate 101 around the center axis of rotation O1.

In the present embodiment, the phosphor layer 100A is formed in a ring-like shape around the center axis of rotation O1 on the upper surface 101a of the rotary substrate 101. A reflector 103 is provided on a side of the phosphor layer 100A that is the side opposite the side on which the first light beam flux K1 formed of the S-polarized component (light beam flux BLs) and the second light beam flux K2 formed of the P-polarized component (light beam flux BBp') are incident. That is, the reflector 103 is provided on a side of the phosphor layer 100A that is the side facing the rotary substrate 101. Further, the phosphor layer 100A is so disposed as to face the first pickup system 15 (pickup lens 15b).

The phosphor layer 100A contains phosphor particles that absorb the first light beam flux K1 formed of the S-polarized component (light beam flux BLs) and the second light beam flux K2 formed of the P-polarized component (light beam flux BBp') as excitation light, convert the first light beam flux K1 and the second light beam flux K2 into the fluorescence light YL, which is yellow light, and output the fluorescence light YL. The phosphor particles can be made, for example, of a YAG-based (yttrium-aluminum-garnet-based) phosphor. The phosphor particles may be made of one material or may be a mixture of two or more types of particles made of materials different from one another.

The phosphor layer 100A may, for example, be a phosphor layer in which the phosphor particles are dispersed in an inorganic binder, such as alumina, or a phosphor layer formed of the phosphor particles sintered with no binder.

The phosphor layer 100A absorbs the first light beam flux K1 formed of the S-polarized component (light beam flux BLs) and the second light beam flux K2 formed of the P-polarized component (light beam flux BBp') as the excitation light and emits the yellow fluorescence YL. The fluorescence YL emitted from the phosphor layer 100A is parallelized by the first pickup system 15 and passes through the first polarization separation element 14.

The fluorescence YL having passed through the first polarization separation element 14 passes through the first retardation film 31. Since the fluorescence YL is non-polarized light, the polarization state of the fluorescence YL does not change before and after it passes through the first retardation film 31.

The fluorescence YL having passed through the first retardation film 31 is incident on the second polarization separation element 19. The fluorescence YL passes through the second polarization separation element 19.

In the light source apparatus 2 according to the present embodiment, which includes the first retardation film 31 disposed between the first polarization separation element 14 and the second polarization separation element 19, the second light beam flux K2 formed of the S-polarized component and separated by the second polarization separation element 19 (light beam flux BBs) is converted into the second light beam flux K2 formed of the P-polarized component (light beam flux BBp'), which is allowed to pass through the first polarization separation element 14.

That is, the first retardation film 31 converts the second light beam flux K2 formed of the S-polarized component (light beam flux BBs) into the second light beam flux K2 formed of the P-polarized component (light beam flux BBp'), which is allowed to pass through the first polarization separation element 14.

The size of the light source apparatus 2 can thus be reduced.

Further, a single region of the phosphor layer 100A can be illuminated with the first light beam flux K1 formed of the S-polarized component (light beam flux BLs) and the second light beam flux K2 formed of the P-polarized component (light beam flux BBp') superimposed on each other. The region from which the fluorescence YL is emitted can therefore be more readily reduced than in a case where no first retardation film 31 is used. That is, an increase in the light flux width of the illumination light WL, which will be described later and contains the fluorescence YL, can be avoided.

Since the first retardation film 31 can be used to reduce a region of the phosphor layer 100A that is the region from which the fluorescence YL is emitted, the size of the first pickup system 15 can be reduced. Further, the reduction in size of the first pickup system 15 allows reduction in size of the entire light source apparatus 2.

The first polarization separation element 14 and the second polarization separation element 19 are so configured that the first polarization separation element 14, the first retardation film 31, and the second polarization separation element 19 transmit the fluorescence YL, the size of the entire light source apparatus is reduced.

The fluorescence YL is incident on the second polarization separation element 19. The second polarization separation element 19 combines the fluorescence YL having passed through the second polarization separation element 19, the diffused second light beam flux K2 formed of the S-polarized component and reflected off the second polarization separation element 19 (light beam flux BL2s), and the diffused first light beam flux (BL1p) having exited out of the first retardation film 31 and polarized in the second direction with one another to produce the white illumination light WL. The illumination light WL in the present embodiment contains the p-polarized diffused blue light BL1p and the S-polarized diffused blue light BL2s at the same proportion.

According to the present embodiment, the components of the first light beam flux K1 (first light beam flux K1 formed of S-polarized component (light beam flux BLs) and first light beam flux K1 formed of P-polarized component (light beam flux BLp)) outputted from the light source section 11 and separated by the first polarization separation element 14 can be used without waste to produce the fluorescence YL and the diffused first light beam flux K1 formed of the S-polarized component (light beam flux BL1s) (diffused first light beam flux (BL1p) polarized in second direction). Further, the components of the second light beam flux K2 (second light beam flux K2 formed of S-polarized component (light beam flux BBs) and second light beam flux K2 formed of P-polarized component (light beam flux BBp)) outputted from the light source section 11 and separated by the second polarization separation element 19 can be used without waste to produce the fluorescence YL and the diffused second light beam flux K2 formed of the S-polarized component (light beam flux BL2s).

The white illumination light WL, which is the combination of the diffused first light beam flux K1 formed of the P-polarized component (light beam flux BL1p), the diffused second light beam flux K2 formed of the S-polarized component (light beam flux BL2s), and the fluorescence YL, will subsequently be described.

The white illumination light WL is incident on the optical integration system 25. The optical integration system 25 is formed, for example, of a first lens array 25a and a second lens array 25b. The first lens array 25a includes a plurality of first lenslets 25am, and the second lens array 25b includes a plurality of second lenslets 25bm. The optical integration system 25 cooperates with the superimposing lens 28, which will be described later, to homogenize the illuminance distribution in each illuminated region.

The first lens array 25a separates the illumination light WL into a plurality of narrow light beam fluxes. The first lenslets 25am focus the narrow light beam fluxes on the corresponding second lenslets 25bm. The images formed on the second lenslets 25bm are derived from the diffused first light beam flux K1 formed of the P-polarized component (light beam flux BL1p), the diffused second light beam flux K2 formed of the S-polarized component (light beam flux BL2s), and the fluorescence YL. That is, secondary light source images formed by the diffused first light beam flux K1 formed of the P-polarized component (light beam flux BL1p), secondary light source images formed by the diffused second light beam flux K2 formed of the S-polarized component (light beam flux BL2s), and secondary light source images formed by the fluorescence YL are formed on the second lens array 25b.

The illumination light WL having passed through the optical integration system 25 is incident on the polarization conversion element 27. The polarization conversion element 27 is formed, for example, of polarization separation films and retardation films (half wave plates). The polarization conversion element 27 converts the fluorescence YL, the polarization directions of which are not aligned with one another, the diffused second light beam flux K2 formed of the S-polarized component (light beam flux BL2s), and the diffused first light beam flux K1 formed of the P-polarized component (light beam flux BL1p) into one of the polarized components (converts P-polarized component into S-polarized component, for example).

Since the illumination light WL in the present embodiment contains the diffused first light beam flux K1 formed of the P-polarized component (light beam flux BL1p) and the diffused second light beam flux K2 formed of the S-polarized component (light beam flux BL2s), the intensity distribution of the light having passed through the polarization conversion element 27 is more uniform than in a case where the illumination light WL contains only one of the polarized components (P-polarized component or S-polarized component).

The illumination light WL in the present embodiment, in particular, contains the diffused first light beam flux K1 formed of the P-polarized component (light beam flux BL1p) and the diffused second light beam flux K2 formed of the S-polarized component (light beam flux BL2s) at the same proportion, whereby the illumination light WL has a further uniform optical intensity distribution.

The illumination light WL having passed through the polarization conversion element 27 is incident on the superimposing lens 28. The illumination light WL having exited out of the superimposing lens 28 enters the color separation system 3. The superimposing lens 28 superimposes the plurality of narrow light beam fluxes described above, which form the illumination light WL, on one another in the illuminated region (image formation region) of each of the light modulators 4R, 4G, and 4B for uniform illumination.

Since the present embodiment prevents the light flux width of the illumination light WL from increasing as described above, an increase in the size of the downstream optical systems (optical integration system 25, polarization conversion element 27, and superimposing lens 28) on which the illumination light WL is incident can be avoided. Therefore, a compact light source apparatus 2 can be provided with the burden on the rotary diffuser plate 120 in terms of optical density reduced.

Further, the size of the projector 1 according to the present embodiment, which includes the light source apparatus 2, can be reduced.

The output from the light source section 11 varies in some cases due to degradation thereof over time. In such cases, the ratio among the diffused first light beam flux K1 formed of the P-polarized component (light beam flux BL1p), the diffused second light beam flux K2 formed of the S-polarized component (light beam flux BL2s), and the fluorescence YL in the illumination light WL changes, the color balance (white balance) of the illumination light WL could undesirably change.

The light source apparatus 2 according to the present embodiment further includes a light quantity monitoring mirror 42, a sensor unit 43, a controller 44, a first driver 45, and a second driver 46, as shown in FIG. 2. The first driver 45 drives and rotates the second retardation film 32 to adjust the angle of rotation of the second retardation film 32. The second driver 46 drives and rotates the third retardation film 33 to adjust the angle of rotation of the third retardation film 33.

In the present embodiment, the light quantity monitoring mirror 42 is provided in the optical path between the optical integration system 25 and the polarization conversion element 27. The light quantity monitoring mirror 42 is so disposed as to incline by 45° with respect to the illumination optical axis ax3. The light quantity monitoring mirror 42 transmits part of the illumination light WL incident thereon and reflects the remainder of the illumination light WL. The light having passed through the light quantity monitoring mirror 42 is incident on the polarization conversion element 27, and the light reflected off the light quantity monitoring mirror 42 is incident on the sensor unit 43.

The sensor unit 43 detects the white balance (color balance) of the illumination light WL outputted from the light source apparatus 2. The sensor unit 43 transmits the result of the detection to the controller 44.

The controller 44 operates the first driver 45 and the second driver 46 based on a signal from the sensor unit 43 (result of detection of color balance). That is, the first driver 45 and the second driver 46 control the angles of rotation of the second retardation film 32 and the third retardation film 33 based on the signal from the sensor unit 43.

Figure 4:
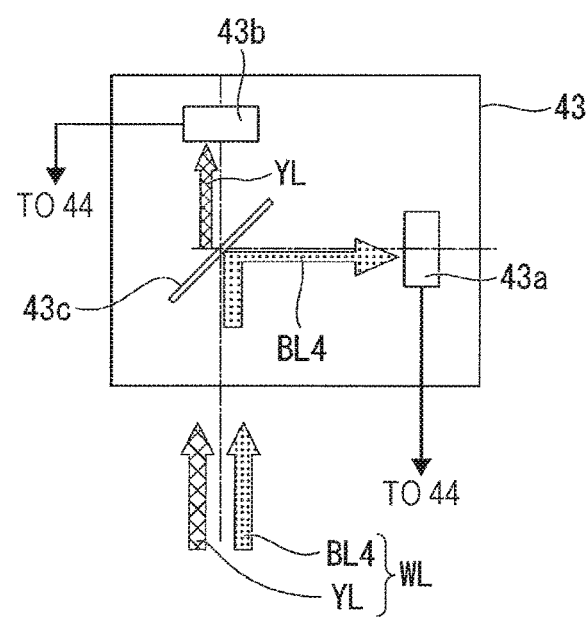
FIG. 4 shows a schematic configuration of a sensor unit.
Figure 5:
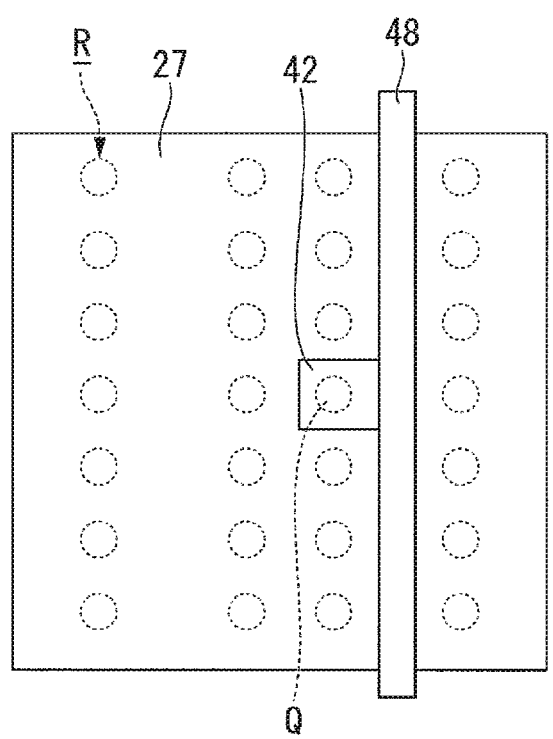
FIG. 5 is a front view showing the arrangement of mirrors in a polarization conversion element.

FIG. 4 shows a schematic configuration of the sensor unit 43. FIG. 5 is a front view showing the arrangement of mirrors in the polarization conversion element 27.

The sensor unit 43 includes a first sensor 43a, a second sensor 43b, and a dichroic mirror 43c, as shown in FIG. 4. The dichroic mirror 43c is formed of a dielectric multilayer film, transmits the fluorescence YL out of the illumination light WL, and reflects blue light BL4 out of the illumination light WL. The blue light BL4 contains, as components thereof, the diffused first light beam flux K1 formed of the P-polarized component (light beam flux BL1p) and the diffused second light beam flux K2 formed of the S-polarized component (light beam flux BL2s) shown in FIG. 2.

The first sensor 43a detects the amount of the blue light BL4 reflected off the dichroic mirror 43c. The second sensor 43b detects the amount of the fluorescence YL having passed through the dichroic mirror 43c. The first sensor 43a and the second sensor 43b are electrically connected to the controller 44 and transmit the results of the detection to the controller 44. The controller 44 controls the rotation of the second retardation film 32 performed by the first drive 45 and the rotation of the third retardation film 33 performed by the second driver 46 based on the results of the detection performed by the first sensor 43a and the second sensor 43b.

The light quantity monitoring mirror 42 is held by a holding member 48, which is so disposed as not to interfere with a plurality of light incidence regions R of the polarization conversion element 27, as shown in FIG. 5. The light incidence regions R of the polarization conversion element 27 are regions on which the plurality of narrow light fluxes having exited out of the optical integration system 25 are incident.

The light quantity monitoring mirror 42 is disposed in a position where one of secondary light source images Q formed by the second lens array 25b via the illumination light WL is formed. In the description, the light quantity monitoring mirror 42 is disposed in the optical path between the optical integration system 25 and the polarization conversion element 27 by way of example. In place of the arrangement described above, the light quantity monitoring mirror 42 may be disposed in the optical path between the polarization conversion element 27 and the superimposing lens 28.

In the present embodiment, the light quantity monitoring mirror 42 is disposed in the optical path between the optical integration system 25 and the polarization conversion element 27 and in the position where one of the secondary light source images Q is incident. The configuration in which the light quantity monitoring mirror 42 is disposed in the optical path and extracts part of the light therefore causes no illuminance unevenness to occur on the light modulator 4R, 4G, or 4B, which is the illuminated region. Therefore, in a case where an illuminance decrease corresponding to one secondary light source image is acceptable, the light quantity monitoring mirror 42 does not need to be a mirror that transmits part of the light and reflects the remainder thereof and may instead be a mirror that reflects the entire light.

An aspect of the control performed by the controller 44 will next be described with reference to FIG. 6.

It is assumed in the following description that the output from the light source section 11 decreases. When the output from the light source section 11 decreases (step S1 in FIG. 6), the amounts of the first light beam flux K1 and the second light beam flux K2 decrease, and the amount of the excitation light (first light beam flux K1 formed of S-polarized component (light beam flux BLs) and second light beam flux K2 formed of P-polarized component (light beam flux BBp')) decreases accordingly. A decrease in the amount of the excitation light is equivalent to a decrease in the optical density of the excitation light (amount of light per unit area) on the phosphor layer 100A (step S2 in FIG. 6). In the following description, it is assumed that the amounts of the first light beam flux K1 and the second light beam flux K2 have decreased by the same amount for ease of description.

In general, a phosphor is characterized in that when the optical density of the excitation light decreases, the conversion efficiency at which the phosphor converts the excitation light into fluorescence increases. Therefore, in a case where the amount of the excitation light decreases by a relatively small value, the conversion efficiency increases and the amount of the fluorescence YL increases accordingly (step S3 in FIG. 6). The description will be made of a case where the amount of the fluorescence YL increases, and the amount of the fluorescence YL instead decreases in some cases. In either case, the white balance deteriorates.

When the output from the light source section 11 decreases, the amounts of the blue light BL4 (diffused first light beam flux K1 formed of P-polarized component (light beam flux BL1p) and diffused second light beam flux K2 formed of S-polarized component (light beam flux BL2s)) also decrease. However, since the conversion efficiency of the phosphor increases, the ratio of the amount of the fluorescence YL to the amount of the blue light BL4 increases, the white balance of the illumination light WL changes accordingly (step S4 in FIG. 6).

Figure 6:
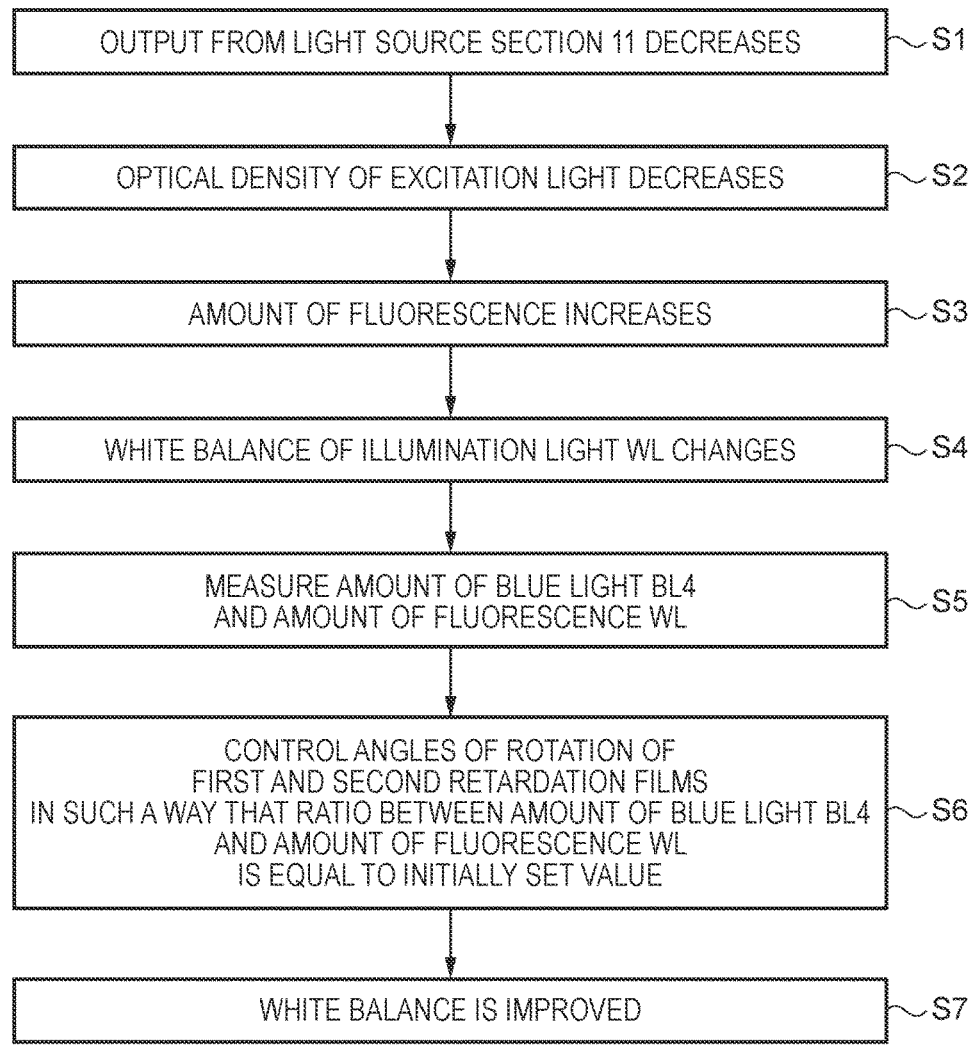
FIG. 6 is a flowchart of white balance adjustment.

In the present embodiment, the sensor unit 43 measures the amount of the blue light BL4 contained in the light extracted by the light quantity monitoring mirror 42 (blue light intensity) and the amount of the yellow fluorescence YL contained in the extracted light (fluorescence intensity) (step S5 in FIG. 6). The sensor unit 43 transmits the result of the measurement to the controller 44.

In the present embodiment, the ratio between the excitation light (blue light) intensity and the fluorescence (yellow light) intensity is so determined as to correspond to a white balance design value, and the controller 44 stores the ratio as a reference value. To achieve the designed white balance, the reference value described above may be set, for example, at a value ranging from 20:80 to 25:75.

The controller 44 compares the ratio between the current excitation light intensity and the current fluorescence intensity (intensity ratio) measured by the sensor unit 43 with the reference value. In a case where the difference between the current intensity ratio and the reference value is greater than an acceptable range as a result of the comparison, the controller 44 controls the first driver 45 to cause it to control the angle of rotation of the second retardation film 32 and controls the second driver 46 to cause it to control the angle of rotation of the third retardation film 33 in such a way that the current intensity ratio approaches the reference value (step S6 in FIG. 6).

Rotating the second retardation film 32 and the third retardation film 33 allows adjustment of the ratio among the amount of the diffused first light beam flux K1 formed of the P-polarized component (light beam flux BL1p), the amount of the diffused second light beam flux K2 formed of the S-polarized component (light beam flux BL2s), and the amount of the fluorescence YL.

Specifically, the second retardation film 32 and the third retardation film 33 are so rotated that the amounts of the first light beam flux K1 formed of the P-polarized component (light beam flux BLp) and the second light beam flux K2 formed of the P-polarized component (light beam flux BBp) directed toward the rotary diffuser plate 120 increase and the amount of the excitation light (first light beam flux K1 formed of S-polarized component (light beam flux BLs) and second light beam flux K2 formed of S-polarized component (light beam flux BBs)) directed toward the rotary fluorescing plate 100 decreases. The ratio of the amount of the fluorescence YL to the amount of the blue light BL4 therefore decreases, whereby the white balance can be improved (step S7 in FIG. 6).

In the present embodiment, the controller 44 controls the second retardation film 32 and the third retardation film 33 in such a way that they rotate in the same direction and by the same angle.

As a result, the ratio between the S-polarized component of the first light beam flux K1 having passed through the second retardation film 32 (first light beam flux K1 formed of S-polarized component (light beam flux BLs)) and the P-polarized component of the first light beam flux K1 having passed through the second retardation film 32 (first light beam flux K1 formed of P-polarized component (light beam flux BLp)) is equal to the ratio between the S-polarized component of the second light beam flux K2 having passed through the third retardation film 33 (second light beam flux K2 formed of S-polarized component (light beam flux BBs)) and the P-polarized component of the second light beam flux K2 having passed through the third retardation film 33 (second light beam flux K2 formed of P-polarized component (light beam flux BBp)). Since the optical densities of the circularly polarized first light beam flux K1 (light beam flux BLc1) and the circularly polarized second light beam flux K2 (light beam flux BBc1) incident on the incidence positions B1 and B2 on the rotary diffuser plate 120 (diffusive reflector 121) are equal to each other, the optical density in either the incidence position B1 or B2 on the rotary diffuser plate 120 is not higher than the other, whereby the white balance can be adjusted with the optical density on the rotary diffuser plate 120 reduced and damage thereof avoided.

The above description has been made of the case where as the output from the light source section 11 decreases and the intensities of the first light beam flux K1 and the second light beam flux K2 decrease by the same proportion. The white balance can be improved in the same manner also in a case where the intensities of the first light beam flux K1 and the second light beam flux K2 decrease by different proportions.

In the case where the intensities of the first light beam flux K1 and the second light beam flux K2 decrease by different proportions, the second retardation film 32 and the third retardation film 33 are so controlled that the angles of rotation thereof differ from each other, whereby the optical densities in the incidence positions B1 and B2 on the rotary diffuser plate 120 (diffusive reflector 121) can be equal to each other. The white balance can thus be adjusted with the burden on the rotary diffuser plate 120 reduced.

The white balance of the illumination light WL can also be adjusted in a case where the output from the light source section 1 does not decrease.

As described above, the light source apparatus 2 according to the present embodiment can adjust the white balance of the illumination light WL. Further, according to the present embodiment, in which the light source apparatus 2 described above is provided, a compact projector 1 having improved reliability and display quality can be provided.

The invention has been described with reference to the embodiment by way of example, but the invention is not necessarily limited to the embodiment described above, and a variety of changes can be made thereto to the extent that the changes do not depart from the substance of the invention.

For example, in the embodiment described above, the light outputting region of the single light source section 11 is divided into two regions (first region A1 and the second region A2), and the first light beam flux K1 and the second light beam flux K2 are outputted from the two regions by way of example. Instead, a configuration in which the first light beam flux K1 and the second light beam flux K2 are outputted from two light source sections may be employed.

In the embodiment described above, the circularly polarized first light beam flux K1 (light beam flux BLc1) is right-handed circularly polarized light and may instead be left-handed circularly polarized light. In this case, the first light beam flux K1 formed of circularly polarized light (light beam flux BLc2) is right-handed circularly polarized light.

Also in this case, the same advantageous effects as those provided by the embodiment described above are provided.

Similarly, in the embodiment described above, the second light beam flux K2 formed of circularly polarized light (light beam flux BBc1) is left-handed circularly polarized light and may instead be right-handed circularly polarized light. In this case, the second light beam flux K2 formed of circularly polarized light (light beam flux BBc2) is left-handed circularly polarized light. Also in this case, the same advantageous effects as those provided by the embodiment described above are provided.

Further, in the embodiment described above, the first light beam flux K1 formed of circularly polarized light (light beam flux BLc1) and the second light beam flux K2 formed of circularly polarized light (light beam flux BBc1) are circularly polarized light fluxes rotating in opposite directions and may instead be circularly polarized light fluxes rotating in the same direction. In this case, the first light beam flux K1 formed of circularly polarized light (light beam flux BLc1) and the second light beam flux K2 formed of circularly polarized light (light beam flux BBc1) are each right-handed or left-handed circularly polarized light. In the case where the first light beam flux K1 formed of circularly polarized light (light beam flux BLc1) and the second light beam flux K2 formed of circularly polarized light (light beam flux BBc1) are each right-handed circularly polarized light, the first light beam flux K1 formed of circularly polarized light (light beam flux BLc2) and the second light beam flux K2 formed of circularly polarized light (light beam flux BBc2) are each left-handed circularly polarized light. Similarly, in the case where the first light beam flux K1 formed of circularly polarized light (light beam flux BLc1) and the second light beam flux K2 formed of circularly polarized light (light beam flux BBc1) are each left-handed circularly polarized light, the first light beam flux K1 formed of circularly polarized light (light beam flux BLc2) and the second light beam flux K2 formed of circularly polarized light (light beam flux BBc2) are each right-handed circularly polarized light.

Also in this case, the same advantageous effects as those provided by the embodiment described above are provided.

In the embodiment described above, the projector 1 including the three light modulators 4R, 4G, and 4B is presented by way of example, and the invention is also applicable to a projector that displays color video images via one light modulator. Further, the light modulators are not limited to the liquid crystal panels described above and can, for example, each be a digital mirror device.

The above embodiment has been described with reference to the case where the light source apparatus according to the embodiment of the invention is applied to a projector, but not necessarily. The light source apparatus according to the embodiment of the invention can also be used, for example, in a lighting apparatus, such as an automobile headlight.

The entire disclosure of Japanese Patent Application No. 2017-165163, filed on Aug. 30, 2017 is expressly incorporated by reference herein.

What is claimed is:

1. A light source apparatus comprising:
a light source section that outputs a first light beam flux and a second light beam flux;
a first polarization separation element that reflects the first light beam flux polarized in a first direction and transmits the first light beam flux polarized in a second direction perpendicular to the first direction;
a second polarization separation element that reflects the second light beam flux polarized in the first direction and transmits the second light beam flux polarized in the second direction;
a rotary diffuser plate which rotates around a center axis of rotation, on which the first light beam flux having passed through the first polarization separation element is incident in a first position separate from the center axis of rotation by a first length, on which the second light beam flux having passed through the second polarization separation element is incident in a second position separate from the center axis of rotation by a second length different from the first length, and which diffuses the incident first light beam flux and second light beam flux;
a first retardation film on which the second light beam flux polarized in the first direction and reflected off the second polarization separation element is incident and which converts the second light beam flux polarized in the first direction into the second light beam flux polarized in the second direction; and
a wavelength conversion element on which the first light beam flux polarized in the first direction and reflected off the first polarization separation element and the second light beam flux polarized in the second direction, having exited out of the first retardation film, and having passed through the first polarization separation element are incident and which converts the first light beam flux polarized in the first direction and the second light beam flux polarized in the second direction into a third light beam flux that belongs to a wavelength band different from a wavelength band to which the first light beam flux polarized in the first direction and the second light beam flux polarized in the second direction belong,
wherein the first polarization separation element and the second polarization separation element transmit the third light beam flux.

2. The light source apparatus according to claim 1, further comprising:
a second retardation film on which the first light beam flux outputted from the light source section is incident, which polarizes the first light beam flux in the first direction and outputs the first light beam flux polarized in the first direction, and which polarizes the first light beam flux in the second direction and outputs the first light beam flux polarized in the second direction; and
a third retardation film on which the second light beam flux outputted from the light source section is incident, which polarizes the second light beam flux in the first direction and outputs the second light beam flux polarized in the first direction, and which polarizes the second light beam flux in the second direction and outputs the second light beam flux polarized in the second direction.

3. The light source apparatus according to claim 2,
wherein the second retardation film and the third retardation film are each configured to be rotatable,
the second retardation film and the third retardation film rotate in a same direction, and
the second retardation film and the third retardation film rotate by a same angle.

4. The light source apparatus according to claim 3, further comprising:
a fourth retardation film on which the first light beam flux polarized in the second direction and passing through the first polarization separation element is incident and which converts the first light beam flux polarized in the second direction into the first light beam flux formed of circularly polarized light; and a fifth retardation film on which the second light beam flux polarized in the second direction and passing through the second polarization separation element is incident and which converts the second light beam flux polarized in the second direction into the second light beam flux formed of circularly polarized light, wherein the first light beam flux formed of circularly polarized light and outputted from the fourth retardation film is circularly polarized light rotating in a first rotational direction and is converted into the first light beam flux formed of circularly polarized light rotating in a second rotational direction different from the first rotational direction when incident on the rotary diffuser plate and diffused by and reflected off the rotary diffuser plate, and the second light beam flux formed of circularly polarized light and outputted from the fifth retardation film is circularly polarized light rotating in the second rotational direction and is converted into the second light beam flux formed of circularly polarized light rotating in the first rotational direction when incident on the rotary diffuser plate and diffused by and reflected off the rotary diffuser plate.

5. The light source apparatus according to claim 4, wherein the fourth retardation film receives as an input the first light beam flux formed of circularly polarized light rotating in the second rotational direction and converts the first light beam flux formed of circularly polarized light rotating in the second rotational direction into the first light beam flux diffused and polarized in the first direction, the fifth retardation film receives as an input the second light beam flux formed of circularly polarized light rotating in the first rotational direction and converts the second light beam flux formed of circularly polarized light rotating in the first rotational direction into the second light beam flux diffused and polarized in the first direction, the diffused first light beam flux polarized in the first direction is reflected off the first polarization separation element, the diffused first light beam flux polarized in the first direction and reflected off the first polarization separation element is incident on the first retardation film and converted by the first retardation film into the first light beam flux diffused and polarized in the second direction, the diffused first light beam flux polarized in the second direction passes through the second polarization separation element, and the diffused second light beam flux polarized in the first direction is reflected off the second polarization separation element.

6. A projector comprising:
the light source apparatus according to claim 5;
a light modulator that modulates light outputted from the light source apparatus in accordance with image information to form image light; and
a projection optical apparatus that projects the image light.

7. A projector comprising:
the light source apparatus according to claim 4;
a light modulator that modulates light outputted from the light source apparatus in accordance with image information to form image light; and
a projection optical apparatus that projects the image light.

8. A projector comprising:
the light source apparatus according to claim 3;
a light modulator that modulates light outputted from the light source apparatus in accordance with image information to form image light; and
a projection optical apparatus that projects the image light.

9. The light source apparatus according to claim 2, further comprising:
a fourth retardation film on which the first light beam flux polarized in the second direction and passing through the first polarization separation element is incident and which converts the first light beam flux polarized in the second direction into the first light beam flux formed of circularly polarized light; and a fifth retardation film on which the second light beam flux polarized in the second direction and passing through the second polarization separation element is incident and which converts the second light beam flux polarized in the second direction into the second light beam flux formed of circularly polarized light, wherein the first light beam flux formed of circularly polarized light and outputted from the fourth retardation film is circularly polarized light rotating in a first rotational direction and is converted into the first light beam flux formed of circularly polarized light rotating in a second rotational direction different from the first rotational direction when incident on the rotary diffuser plate and diffused by and reflected off the rotary diffuser plate, and the second light beam flux formed of circularly polarized light and outputted from the fifth retardation film is circularly polarized light rotating in the second rotational direction and is converted into the second light beam flux formed of circularly polarized light rotating in the first rotational direction when incident on the rotary diffuser plate and diffused by and reflected off the rotary diffuser plate.

10. The light source apparatus according to claim 9, wherein the fourth retardation film receives as an input the first light beam flux formed of circularly polarized light rotating in the second rotational direction and converts the first light beam flux formed of circularly polarized light rotating in the second rotational direction into the first light beam flux diffused and polarized in the first direction, the fifth retardation film receives as an input the second light beam flux formed of circularly polarized light rotating in the first rotational direction and converts the second light beam flux formed of circularly polarized light rotating in the first rotational direction into the second light beam flux diffused and polarized in the first direction, the diffused first light beam flux polarized in the first direction is reflected off the first polarization separation element, the diffused first light beam flux polarized in the first direction and reflected off the first polarization separation element is incident on the first retardation film and converted by the first retardation film into the first light beam flux diffused and polarized in the second direction, the diffused first light beam flux polarized in the second
direction passes through the second polarization separation element, and the diffused second light beam flux polarized in the first
direction is reflected off the second polarization separation element.

11. A projector comprising:
the light source apparatus according to claim 10;
a light modulator that modulates light outputted from the
light source apparatus in accordance with image information to form image light; and
a projection optical apparatus that projects the image
light.

12. A projector comprising:
the light source apparatus according to claim 9;
a light modulator that modulates light outputted from the
light source apparatus in accordance with image information to form image light; and
a projection optical apparatus that projects the image
light.

13. A projector comprising:
the light source apparatus according to claim 2;
a light modulator that modulates light outputted from the
light source apparatus in accordance with image information to form image light; and
a projection optical apparatus that projects the image
light.

14. The light source apparatus according to claim 1,
further comprising:
a fourth retardation film on which the first light beam flux
polarized in the second direction and passing through
the first polarization separation element is incident and
which converts the first light beam flux polarized in the
second direction into the first light beam flux formed of
circularly polarized light; and
a fifth retardation film on which the second light beam
flux polarized in the second direction and passing
through the second polarization separation element is
incident and which converts the second light beam flux
polarized in the second direction into the second light
beam flux formed of circularly polarized light,
wherein the first light beam flux formed of circularly
polarized light and outputted from the fourth retardation film is circularly polarized light rotating in a first
rotational direction and is converted into the first light
beam flux formed of circularly polarized light rotating
in a second rotational direction different from the first
rotational direction when incident on the rotary diffuser
plate and diffused by and reflected off the rotary diffuser plate, and
the second light beam flux formed of circularly polarized
light and outputted from the fifth retardation film is
circularly polarized light rotating in the second rotational direction and is converted into the second light
beam flux formed of circularly polarized light rotating
in the first rotational direction when incident on the
rotary diffuser plate and diffused by and reflected off
the rotary diffuser plate.

15. The light source apparatus according to claim 14,
wherein the fourth retardation film receives as an input the
first light beam flux formed of circularly polarized light
rotating in the second rotational direction and converts
the first light beam flux formed of circularly polarized
light rotating in the second rotational direction into the
first light beam flux diffused and polarized in the first
direction,
the fifth retardation film receives as an input the second
light beam flux formed of circularly polarized light
rotating in the first rotational direction and converts the
second light beam flux formed of circularly polarized
light rotating in the first rotational direction into the
second light beam flux diffused and polarized in the
first direction,
the diffused first light beam flux polarized in the first
direction is reflected off the first polarization separation
element,
the diffused first light beam flux polarized in the first
direction and reflected off the first polarization separation element is incident on the first retardation film and
converted by the first retardation film into the first light
beam flux diffused and polarized in the second direction,
the diffused first light beam flux polarized in the second
direction passes through the second polarization separation element, and
the diffused second light beam flux polarized in the first
direction is reflected off the second polarization separation element.

16. A projector comprising:
the light source apparatus according to claim 15;
a light modulator that modulates light outputted from the
light source apparatus in accordance with image information to form image light; and
a projection optical apparatus that projects the image
light.

17. A projector comprising:
the light source apparatus according to claim 14;
a light modulator that modulates light outputted from the
light source apparatus in accordance with image information to form image light; and
a projection optical apparatus that projects the image
light.

18. A projector comprising:
the light source apparatus according to claim 1;
a light modulator that modulates light outputted from the
light source apparatus in accordance with image information to form image light; and
a projection optical apparatus that projects the image
light.

* * * * *